(12) United States Patent
Ilg et al.

(10) Patent No.: US 7,224,561 B2
(45) Date of Patent: May 29, 2007

(54) PROTECTIVE CIRCUIT AND METHOD FOR OPERATING SAID PROTECTIVE CIRCUIT, IN PARTICULAR FOR OVERVOLTAGE PROTECTION FOR AN ELECTRONIC CONTROL SYSTEM FOR A MOTOR VEHICLE

(75) Inventors: Johannes Ilg, Regensburg (DE); Dirk Reichow, Zell (DE); Thomas Simmerl, Hagelstadt (DE)

(73) Assignee: Siemens Aktiengesellschaft, Munich (DE)

( * ) Notice: Subject to any disclaimer, the term of this patent is extended or adjusted under 35 U.S.C. 154(b) by 672 days.

(21) Appl. No.: 10/633,757

(22) Filed: Aug. 4, 2003

(65) Prior Publication Data
US 2004/0114291 A1    Jun. 17, 2004

(30) Foreign Application Priority Data
Aug. 6, 2002   (DE) ............................... 102 36 005

(51) Int. Cl.
*H02H 9/00*   (2006.01)
(52) U.S. Cl. ...................................... 361/91.1; 361/115
(58) Field of Classification Search ............... 361/91.1, 361/115
See application file for complete search history.

(56) References Cited

U.S. PATENT DOCUMENTS

| | | | | |
|---|---|---|---|---|
| 4,093,900 A | * | 6/1978 | Plunkett | 318/370 |
| 6,232,754 B1 | * | 5/2001 | Liebler et al. | 323/272 |
| 6,473,284 B1 | * | 10/2002 | Ilic et al. | 361/91.1 |

FOREIGN PATENT DOCUMENTS

| | | |
|---|---|---|
| DE | 197 42 391 C1 | 11/1998 |
| DE | 197 55 259 A1 | 6/1999 |

* cited by examiner

*Primary Examiner*—Stephen W. Jackson
(74) *Attorney, Agent, or Firm*—Baker Botts L.L.P.

(57) ABSTRACT

Protective circuit and a method for operating said protective circuit in particular for overvoltage protection for an electronic control system for a motor vehicle protective circuit, comprising a control unit (1) and a switch unit, with the switch unit monitoring an input voltage of a voltage regulator (2), which is directly or indirectly associated with the supply voltage (VCC) of the control unit (1). If this input voltage (UBAT) exceeds a predetermined threshold voltage (USCHWELLE), the control unit (1) switches in one or more loads. If the control unit has an idle mode and an operating mode, it is switched from idle mode to operating mode and if necessary a further load (RL) is switched in.

20 Claims, 3 Drawing Sheets

PROTECTIVE CIRCUIT AND METHOD FOR OPERATING SAID PROTECTIVE CIRCUIT, IN PARTICULAR FOR OVERVOLTAGE PROTECTION FOR AN ELECTRONIC CONTROL SYSTEM FOR A MOTOR VEHICLE

PRIORITY

This application claims foreign priority of the German application DE 10236005.7 filed on Aug. 6, 2002.

TECHNICAL FIELD OF THE INVENTION

The invention relates to a protective circuit, in particular for overvoltage protection for an electronic control system for a motor vehicle and a method for operating said protective circuit.

BACKGROUND OF THE INVENTION

In order to prevent malfunction or destruction of a microprocessor, it is necessary to limit the signals at the signal and voltage inputs of the microprocessor.

A measure known by companies for limiting input signals is known as signal "clamping". For this purpose an input of the microprocessor, as shown in FIG. 2, is connected via a first diode (D1) to the voltage supply (VCC) to the microprocessor. The anode of the diode is connected to the input. The anode of a second diode (D2), the cathode of which is connected to the input, is earthed. This means that the maximum input voltage is equal to the sum of the supply voltage and a threshold voltage of the respective diode. The electric current flowing into the input of the microprocessor is limited by means of a resistor.

One disadvantage of this circuit arrangement is that the supply voltage to the microprocessor increases, once the latter is in an inactive mode and can no longer consume the current fed in via the protective circuit.

Companies also know how to supplement this circuit arrangement with a Zener diode (D3), which is connected between earth and the supply voltage (VCC)—as shown by the broken line in FIG. 2. The Zener diode (D3) becomes conductive once a threshold voltage is exceeded. This prevents a build-up of supply voltage (VCC).

Because of the frequently strict voltage tolerances of a microprocessor, it is however usually not possible to use a Zener diode (D3), as the predetermined voltage thresholds mean that there is either a significant idle current or the voltage is no longer limited within a permitted operating voltage range.

FIG. 3 shows a third protective circuit for a microprocessor known to companies. With this circuit arrangement a transistor stage is connected before each microprocessor input; this transistor stage, comprising a transistor (T5), a diode (D5) and three resistors (R5, R6 and R7), has the function of potential isolation. The transistor stage means that the voltage at the input of the microprocessor is never greater than the supply voltage at the microprocessor.

It is a disadvantage here that the connections to every input mean that a significantly larger number of components have to be used and every transistor in turn has to be protected against overvoltage.

A method and device for protecting one or more vehicle control devices connected to a motor vehicle on-board network against overvoltage pulses are known (DE 197 42 391 C1). With these, a sensor is used to detect an overvoltage pulse and one or more consumer units are enabled when such overvoltage occurs. In this way the overvoltage pulse is degraded quickly and before it reaches its maximum value and the electronic circuits and control devices in the motor vehicle are therefore protected. With the known device external loads, such as dipped headlights, an interior light, air conditioning unit, regulating motor or central locking are activated, to compensate for an overvoltage pulse.

SUMMARY OF THE INVENTION

The object of the invention is to create a protective circuit for a microprocessor and a method for operating said protective circuit, which protect a microprocessor simply and reliably against overvoltage.

This object can be achieved by a protective circuit, in particular for overvoltage protection for an electronic control system for a motor vehicle, comprising a potential converter with an input and an output, which supplies a supply voltage when fed an external voltage, a control unit, which is connected electrically to the supply voltage and to earth, a first switch unit, which monitors the external voltage and, when a predetermined voltage threshold value is exceeded, generates a control signal at an input of the control unit, and a second switch unit, which is part of the control unit and switches in one or more loads at least partially in response to the control signal at the input.

One switched in load can be the control unit, with this being switched from idle mode to operating mode. The second switch unit may switch in a further load, when a control signal is present at the input and the control unit is already in operating mode. The first switch unit comprises a transistor stage, which is connected electrically to the input of the control unit. The further load can be supplied with energy by the potential converter. The transistor stage may comprise a transistor whose load path is coupled in series with a diode and a resistor. The transistor stage can be coupled with the input of the potential converter. The transistor may be a bipolar transistor whose base is coupled with the output of the potential converter, whose emitter is coupled with the diode, and whose collector is coupled with the control unit. The potential converter can be a DC-DC converter. The control unit can be a microprocessor unit.

The object may also be achieved by a method for operating a protective circuit, comprising the steps:

monitoring an input voltage of a potential converter by a switch unit, if the voltage exceeds a predetermined threshold voltage, then generating a control signal at an input of a control unit, in response to which the control unit switches in one or more loads at least partially.

When the predetermined threshold voltage is exceeded, the control unit can be switched from idle mode to operating mode. When the predetermined threshold voltage is exceeded, a further load can be switched in, if the control unit is already in operating mode and/or the monitored voltage requires this.

The protective circuit comprises a control unit, a potential transformer and a switch unit. The potential transformer generates an internal supply voltage from an external voltage and this supplies the control unit with energy.

The switch unit is connected electrically to an input of the control unit. The switch unit generates a control signal at the input of the control unit depending on the external voltage on which the internal supply voltage of the control unit directly or indirectly depends.

When a predetermined threshold value is exceeded, one or more loads are switched in at least partially by the control signal generated by the switch unit. The switched in load is then supplied with energy by the internal supply voltage. Internal power consumption increases, thereby preventing a build-up of internal supply voltage.

The control unit advantageously has an idle mode and an operating mode. The control unit is then initially switched from rest to operating mode, when the external voltage exceeds the threshold value.

Idle mode is a mode, in which the control unit has a lower energy requirement than in operating mode.

If the control unit is already in operating mode or switching from idle mode to operating mode is not sufficient to return the monitored voltage to the permitted voltage range, a further load can be switched in via an output of the microprocessor, to increase the power consumption of the system further.

In this way the power consumption of the circuit arrangement is increased and the voltage supplying the control unit is reduced.

This also prevents the supply voltage reaching a non-permitted voltage range.

Information about the exceeding of a predetermined supply voltage threshold can also be forwarded via further outputs of the microprocessor.

BRIEF DESCRIPTION OF THE DRAWINGS

A preferred embodiment is described in more detail below using the schematic drawings.

DETAILED DESCRIPTION OF THE PREFERRED EMBODIMENTS

Figure 1:
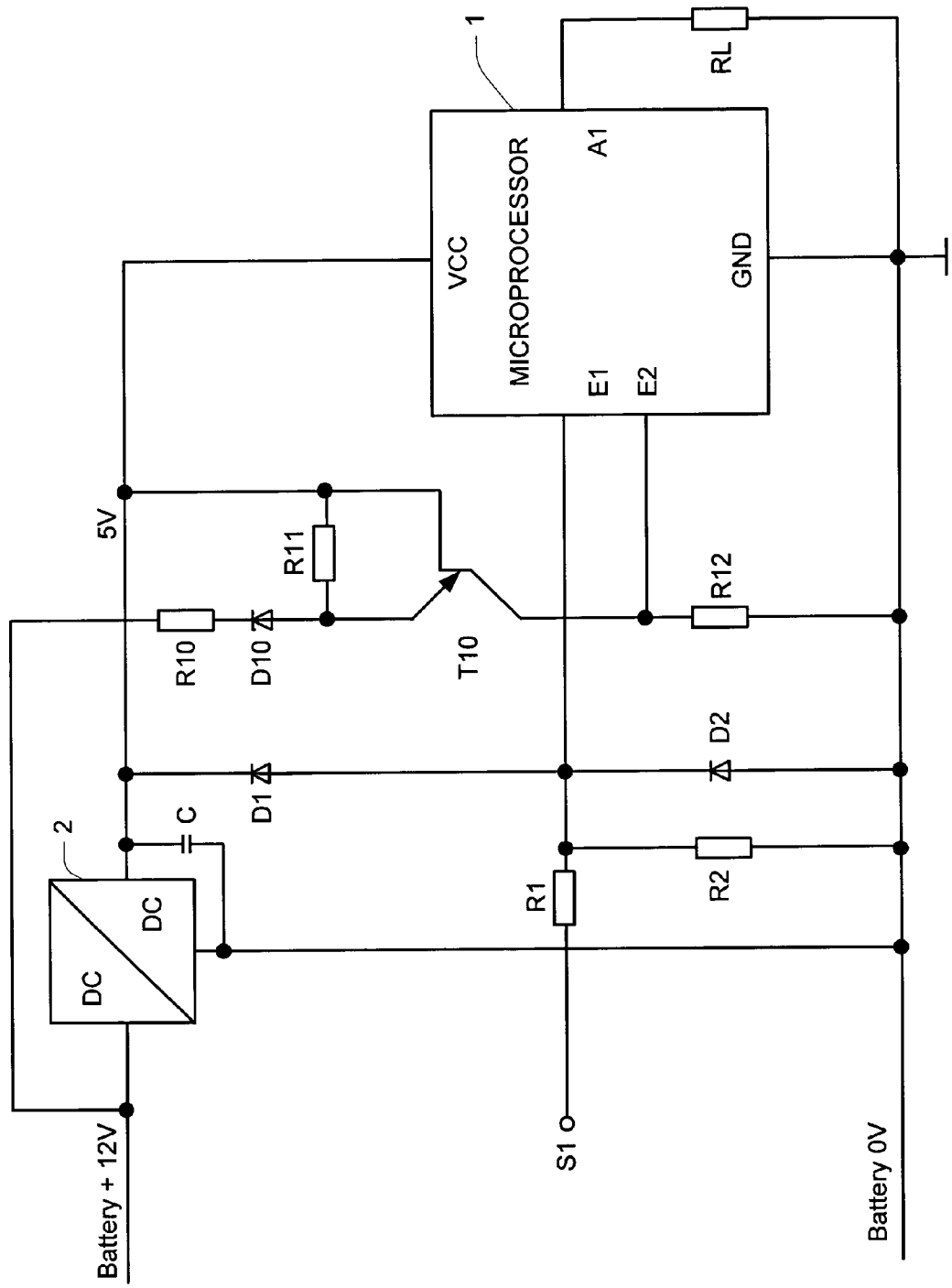
FIG. 1 shows a protective circuit according to the invention.
Figure 2:
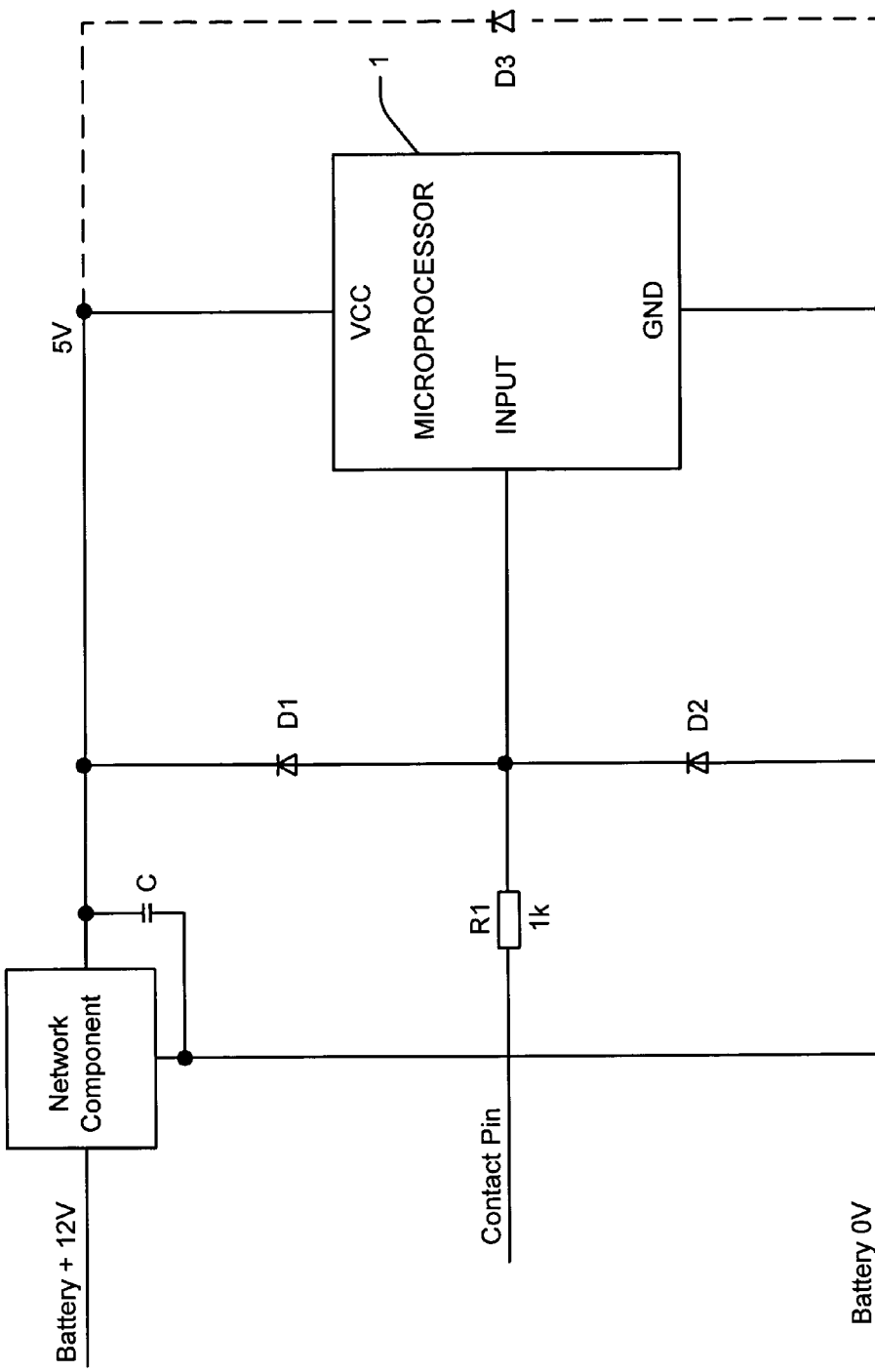
FIG. 2 shows a known protective circuit.
Figure 3:
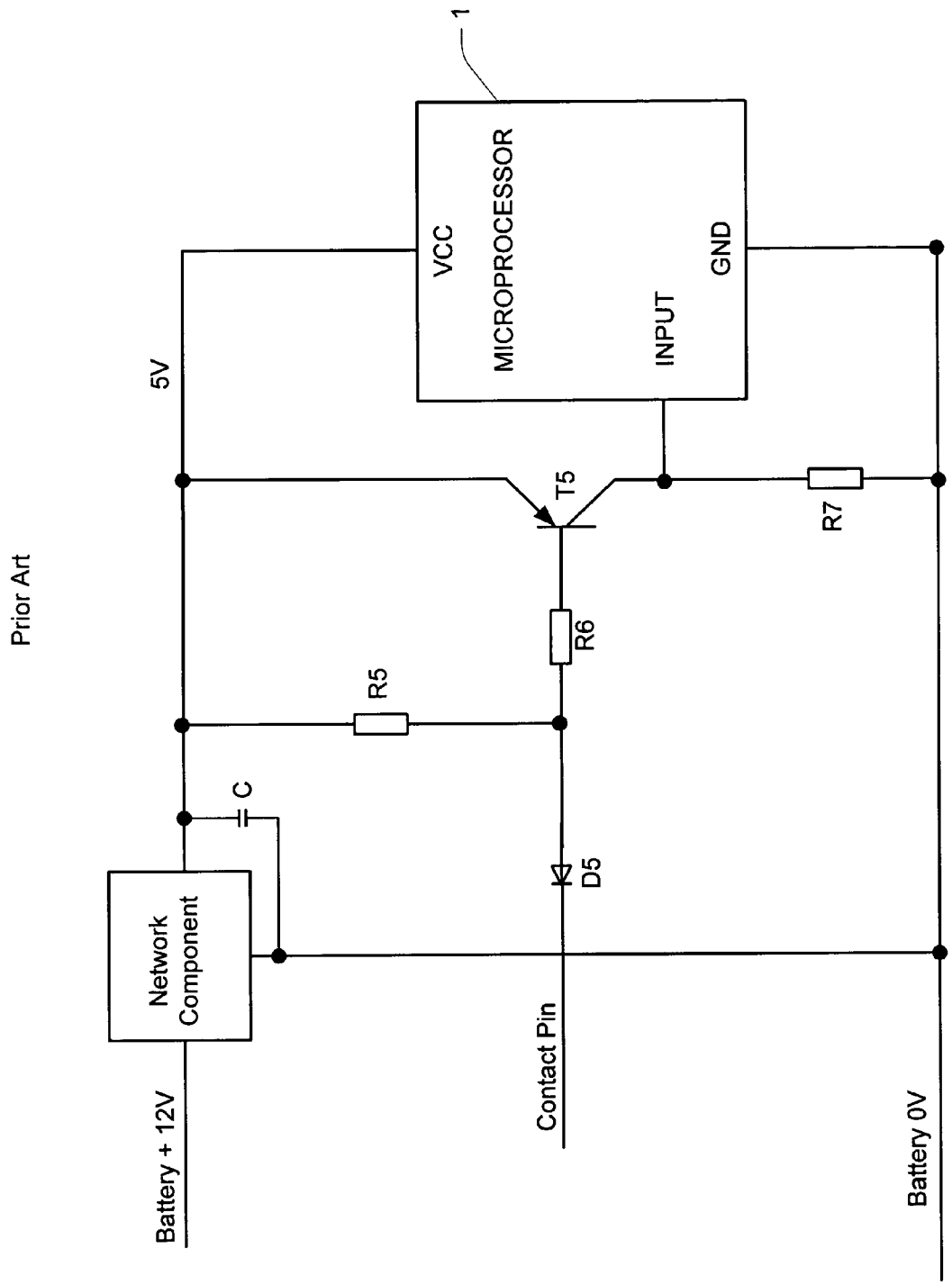
FIG. 3 shows a further known protective circuit.

The circuit arrangement shown in FIG. 1 comprises a microprocessor 1, which is connected electrically to the output of a potential converter 2 and which is supplied by this latter with a supply voltage VCC. The potential converter 2 is connected electrically on the input side to a battery with a rated voltage of 12 volts (not shown). The battery supplies a voltage UBAT.

The microprocessor 1 has a first input E1 and a second input E2 as well as an output A1.

The first input E1 is connected to a control input S1 via a voltage divider comprising two resistor R1 and R2. External control signals are fed to the microprocessor 1 via this control input S1.

The circuit arrangement also comprises a first diode D1 and a second diode D2. The anode of the first diode D1 is connected to the input E1 and its cathode is connected to the positive supply voltage VCC. The cathode of the second diode D2 is connected to the input E1 and its anode is earthed.

The second input E2 is earthed via a resistor R12. The second input E2 is also connected to a collector of a transistor T10. The transistor T10 here is a pnp transistor. The base of the transistor T10 is connected to the positive supply voltage VCC of the microprocessor 1. The emitter of the transistor T10 is connected via a diode D10 and a resistor R10 to the positive connection of the battery (not shown). A further resistor R11 is arranged between the emitter and the base of the transistor T10.

The output A1 of the microprocessor 1 is earthed via a load RL.

If the voltage at the control input S1 exceeds a threshold voltage predetermined by the supply voltage VCC and the threshold voltage of the two diodes D1 and D2, the diode D1 or the diode D2 switches through, depending on whether the threshold voltage is exceeded in a positive or a negative direction, and dissipates the overvoltage to the supply voltage VCC or to earth. The voltage at the input E1 is thereby limited to a value predetermined by VCC, D1 and D2. The diodes D1, D2 are protective diodes, which prevent destruction of the microprocessor 1 by means of what is known as a "latch-up" effect. If the input voltage rises above a threshold value, a channel-substrate diode in the microprocessor 1 starts to conduct, thereby flooding the substrate with charge carriers. This can lead to a short circuit of the supply voltage VCC and as a result the destruction of the microprocessor.

If the battery voltage UBAT exceeds a predetermined voltage threshold value, USCHWELLE, the transistor T10 switches through. The voltage threshold value USCHWELLE is determined by appropriate selection of the transistor T10 and the diode D. Here the threshold value USCHWELLE is set at approx. 18 volts.

In this way the input E2 of the microprocessors is switched from low level to high level, once the battery voltage UBAT exceeds the predetermined threshold value USCHWELLE.

The voltage levels are defined as follows:

Low level: 0 volts<U<0.05 volts

High level: 4.95 volts<U<5 volts

The input E2 is a "wake-up" input. The edge resulting at the input E2 of the microprocessor 1 from the switch from low level to high level is interpreted as a wake-up signal.

This triggers the following reaction in the microprocessor:
If the microprocessor is in idle mode, it is switched to operating mode, or
If the microprocessor is already in operating mode, a further load RL is switched in via the output A1.

Both measures increase the power consumption of the circuit arrangement, thereby compensating for voltage peaks.

The wake-up signal at the input E2 enables an oscillator (not shown here), which is disabled in idle mode. The power consumption of the microprocessor increases as a result, as with a CMOS element power consumption depends on switching frequency.

The power consumption of a microprocessor 1 used as an example, which consumes 60 to 170 μA in idle mode, increases to a power consumption of 50 mA in operating mode.

The permitted voltage range for the supply voltage VCC depends on the permitted voltage tolerances of the components used. This voltage range can for example be between 4.7 and 5.2 V.

A capacitor C is arranged between the output of the potential converter 2 and earth and levels off fast voltage peaks, which are below the reaction time required by the microprocessor to switch from idle to operating mode.

The further load RL can be a resistor for example, which is part of the circuit arrangement or part of a control device, which is protected against overvoltage by the circuit arrangement.

Such exceeding of a threshold voltage identified in this way can also be used for further functions. For example it can be used for disconnecting end stages or inputs, which are sensitive to overvoltage.

The information that a certain voltage threshold has been exceeded can also be transmitted via a motor vehicle bus to other control devices and/or input in a diagnosis error memory.

The invention claimed is:

1. Protective circuit, in particular for overvoltage protection for an electronic control system for a motor vehicle, comprising:
    a potential converter with an input and an output, which supplies a supply voltage when fed an external voltage,
    a control unit, which is connected electrically to the supply voltage and to earth,
    a first switch unit, which monitors the external voltage and, when a predetermined voltage threshold value is exceeded, generates a control signal at an input of the control unit, and
    a second switch unit, which is part of the control unit and switches in one or more loads at least partially in response to the control signal at the inputs,
    wherein one switched in load is the control unit, which is being switched from idle mode to operating mode.

2. Protective circuit according to claim 1, wherein the second switch unit switches in a further load, when a control signal is present at the input and the control unit is already in operating mode.

3. Protective circuit according to claim 1, wherein the first switch unit comprises a transistor stage, which is connected electrically to the input of the control unit.

4. Protective circuit according to claim 1, wherein the further load is supplied with energy by the potential converter.

5. Protective circuit according to claim 3, wherein the transistor stage comprises a transistor whose load path is coupled in series with a diode and a resistor.

6. Protective circuit according to claim 5, wherein the transistor stage is coupled with the input of the potential converter.

7. Protective circuit according to claim 6, wherein the transistor is a bipolar transistor whose base is coupled with the output of the potential converter, whose emitter is coupled with the diode, and whose collector is coupled with the control unit.

8. Protective circuit according to claim 1, wherein the potential converter is a DC-DC converter.

9. Protective circuit according to claim 1, wherein the control unit is a microprocessor unit.

10. Method for operating a protective circuit, comprising the steps:
    monitoring an input voltage of a potential converter by a switch unit,
    if the voltage exceeds a predetermined threshold voltage, then generating a control signal at an input of a control unit, in response to which the control unit switches in one or more loads at least partially, when the predetermined threshold voltage is exceeded, the control unit is switched from idle mode to operating mode.

11. Method for operating a protective circuit, comprising the steps:
    monitoring an input voltage of a potential converter by a switch unit,
    if the voltage exceeds a predetermined threshold voltage, then generating a control signal at an input of a control unit, in response to which the control unit switches in one or more loads at least partially, wherein
    when the predetermined threshold voltage is exceeded, a further load is switched in, if the control unit is already in operating mode and/or the monitored voltage requires this.

12. Protective circuit, in particular for overvoltage protection for an electronic control system for a motor vehicle, comprising:
    a potential converter with an input and an output, which supplies a supply voltage when fed an external voltage,
    a control unit, which is connected electrically to the supply voltage and to earth,
    a first switch unit, which monitors the external voltage and, when a predetermined voltage threshold value is exceeded, generates a control signal at an input of the control unit, and
    a second switch unit, which is part of the control unit and switches in one or more loads at least partially in response to the control signal at the input, wherein the further load is supplied with energy by the potential converter.

13. Protective circuit according to claim 12, wherein one switched in load is the control unit, with this being switched from idle mode to operating mode.

14. Protective circuit according to claim 12, wherein the second switch unit switches in a further load, when a control signal is present at the input and the control unit is already in operating mode.

15. Protective circuit according to claim 12, wherein the first switch unit comprises a transistor stage, which is connected electrically to the input of the control unit.

16. Protective circuit according to claim 12, wherein the transistor stage comprises a transistor whose load path is coupled in series with a diode and a resistor.

17. Protective circuit according to claim 16, wherein the transistor stage is coupled with the input of the potential converter.

18. Protective circuit according to claim 17, wherein the transistor is a bipolar transistor whose base is coupled with the output of the potential converter, whose emitter is coupled with the diode, and whose collector is coupled with the control unit.

19. Protective circuit according to claim 12, wherein the potential converter is a DC-DC converter.

20. Protective circuit according to claim 12, wherein the control unit is a microprocessor unit.

* * * * *